United States Patent

Huang et al.

(10) Patent No.: US 10,527,888 B2
(45) Date of Patent: Jan. 7, 2020

(54) LIQUID CRYSTAL DISPLAY PANEL AND LIQUID CRYSTAL DISPLAY DEVICE

(71) Applicant: Wuhan China Star Optoelectronics Technology Co., Ltd., Wuhan, Hubei (CN)

(72) Inventors: Chang-chih Huang, Guangdong (CN); Chaoqun Yang, Guangdong (CN)

(73) Assignee: Wuhan China Star Optoelectronics Technology Co., Ltd., Wuhan (CN)

(*) Notice: Subject to any disclaimer, the term of this patent is extended or adjusted under 35 U.S.C. 154(b) by 0 days.

(21) Appl. No.: 16/128,750

(22) Filed: Sep. 12, 2018

(65) Prior Publication Data

US 2019/0369444 A1 Dec. 5, 2019

Related U.S. Application Data

(63) Continuation of application No. PCT/CN2018/097414, filed on Jul. 27, 2018.

(30) Foreign Application Priority Data

May 30, 2018 (CN) .......................... 2018 1 0538867

(51) Int. Cl.
*G02F 1/1335* (2006.01)
*G02F 1/1339* (2006.01)
(Continued)

(52) U.S. Cl.
CPC .... *G02F 1/133617* (2013.01); *G02F 1/13394* (2013.01); *G02F 1/133512* (2013.01);
(Continued)

(58) Field of Classification Search
CPC ... G02F 2001/133614; G02F 1/133514; G02F 2001/133311; G02F 1/133617; G02F 1/133512
See application file for complete search history.

(56) References Cited

U.S. PATENT DOCUMENTS 10,068,949 B2 9/2018 Jiang
2007/0121032 A1* 5/2007 Okishiro ........... G02F 1/133604
349/70

(Continued)

FOREIGN PATENT DOCUMENTS

CN 203658706 U 6/2014
CN 104143564 A 11/2014
(Continued)

*Primary Examiner* — Jessica M Merlin

(57) ABSTRACT

A liquid crystal display panel and a liquid crystal display device are disclosed. The liquid crystal display panel includes a color film substrate, an array substrate disposed to face the color film substrate, and a blue backlight disposed on a side of the array substrate away from the color film substrate. The color film substrate includes a base substrate, red quantum dot blocks, green quantum dot blocks and blue light blocks disposed on the substrate. The color film substrate further includes a yellow light layer disposed between the red quantum dot blocks and the base substrate, and also between the green quantum dot blocks and the base substrate. The yellow light layer in the liquid crystal display panel of the present disclosure may block blue light, thereby improving the color gamut value.

16 Claims, 3 Drawing Sheets

(51) Int. Cl.
*G02F 1/1333* (2006.01)
*G02F 1/13357* (2006.01)

(52) U.S. Cl.
CPC .......... *G02F 1/133528* (2013.01); *G02F 2001/133357* (2013.01); *G02F 2001/133548* (2013.01); *G02F 2001/133614* (2013.01)

(56) References Cited

U.S. PATENT DOCUMENTS

| | | |
|---|---|---|
| 2011/0261294 A1 | 10/2011 | Jang et al. |
| 2015/0318506 A1 | 11/2015 | Zhou et al. |
| 2016/0033823 A1 | 2/2016 | Lee et al. |
| 2018/0102449 A1* | 4/2018 | Pschenitzka ...... G02F 1/133617 |
| 2018/0269362 A1* | 9/2018 | Lee ...................... H01L 33/502 |
| 2018/0364521 A1* | 12/2018 | Baek ...................... G02B 1/113 |

FOREIGN PATENT DOCUMENTS

| | | |
|---|---|---|
| CN | 104360540 A | 2/2015 |
| CN | 105044974 A | 11/2015 |
| CN | 106338857 A | 1/2017 |
| CN | 106773312 A | 5/2017 |
| CN | 107290896 A | 10/2017 |
| JP | 2016167041 A | 9/2016 |
| WO | 2015041316 A1 | 3/2015 |

\* cited by examiner

LIQUID CRYSTAL DISPLAY PANEL AND LIQUID CRYSTAL DISPLAY DEVICE

CROSS-REFERENCE TO RELATED APPLICATIONS

The present application is a continuation-application of International (PCT) Patent Application No. PCT/CN2018/097414 filed on Jul. 27, 2018, which claims foreign priority of Chinese Patent Application No. 201810538867.0, filed on May 30, 2018 in the State Intellectual Property Office of China, the entire contents of which are hereby incorporated by reference.

TECHNICAL FIELD

The present disclosure relates to a technical field of liquid crystal display technology, and particularly to a liquid crystal display panel and a liquid crystal display device.

BACKGROUND

In related art, the NTSC color gamut of a liquid crystal display is 90% to 100%. The wavelength of light generated by quantum dots material may range from that of infrared light to that of visible light. Also, quantum dots material may have advantages such as narrow light emission band and high conversion efficiency, and a display panel with quantum dots may have high color saturation. Thus, quantum dots are applied to color blocks so as to form quantum dot color blocks to increase the color gamut value of a liquid crystal display to more than 90% BT.2020 gamut (equivalent to 134% NTSC gamut).

However, the quantum dot color blocks are excited by blue light to emit color light. When some blue light passes through red quantum dot blocks or green quantum dot blocks of the liquid crystal display, the color gamut value of the liquid crystal display is lowered, thereby affecting the display effect.

Therefore, it is necessary to provide a liquid crystal display panel and a liquid crystal display device to solve the above technical problems.

SUMMARY

The present disclosure provides a liquid crystal display panel and a liquid crystal display device to solve the problems of the related art. The liquid crystal display panel may enhance the color gamut value and improve the display effect.

In order to solve the above technical problem, one of the technical solutions adopted in the present disclosure is to provide a liquid crystal display panel. The liquid crystal display panel may include an array substrate, a color film substrate, and a blue backlight. The array substrate is disposed to face the color film substrate. The blue backlight is disposed on a side of the array substrate away from the color film substrate. The color film substrate may include a base substrate, red quantum dot blocks, green quantum dot blocks, blue light blocks and a yellow light layer. The red quantum dot blocks, green quantum dot blocks and blue light blocks are spaced apart from each other and disposed on the base substrate. The yellow light layer is disposed between the red quantum dot blocks and the base substrate and also between the green quantum dot blocks and the base substrate.

In order to solve the above technical problem, another technical solution adopted in the present disclosure is to provide a liquid crystal display device including the liquid crystal display panel as described above.

The beneficial effect of the above embodiments lies in that: the color film substrate in the liquid crystal display panel of the present disclosure may include a base substrate, red quantum dot blocks, green quantum dot blocks, blue light blocks and a yellow light layer. The red quantum dot blocks, green quantum dot blocks and blue light blocks are spaced apart from each other and disposed on the base substrate. The yellow light layer is interposed between the red quantum dot blocks and the base substrate and also between the green quantum dot blocks and the base substrate. The yellow light layer may block the blue light penetrating through the red quantum dot blocks and the green quantum dot blocks to avoid the influence of the blue light to the red quantum dot blocks and the green quantum dot blocks. Thus, the implementation of the present disclosure may enhance the color gamut value of the liquid crystal display panel and improve the display effect.

DETAILED DESCRIPTION

The technical solutions in the embodiments of the present disclosure will be clearly described as follows. Apparently, the described embodiments are merely a part but not all of the embodiments of the present disclosure. All other embodiments obtained by the ordinary skilled in the art according to the embodiments of the present disclosure without any creative efforts shall fall into the protection scope of the present disclosure.

Red quantum dot blocks, green quantum dot blocks, and blue quantum dot blocks may respectively display red, green, and blue color after being excited by a blue light emitted by a blue backlight. Some of the blue light may penetrate through the red quantum dot blocks and the green quantum dot blocks, which may reduce the color gamut value of a liquid crystal display panel and affect the display effect. In order to augment the color gamut value, in the liquid crystal display panel of the present disclosure, a yellow light layer may be disposed on a side of the red quantum dot blocks and the green quantum dot blocks away from the blue backlight. The yellow light layer may block the blue light penetrating through the red quantum dot blocks and the green quantum dot blocks, so as to enhance the color gamut value of the liquid crystal display panel. Hereinafter, the details will be described with reference to the drawings.

Figure 1:
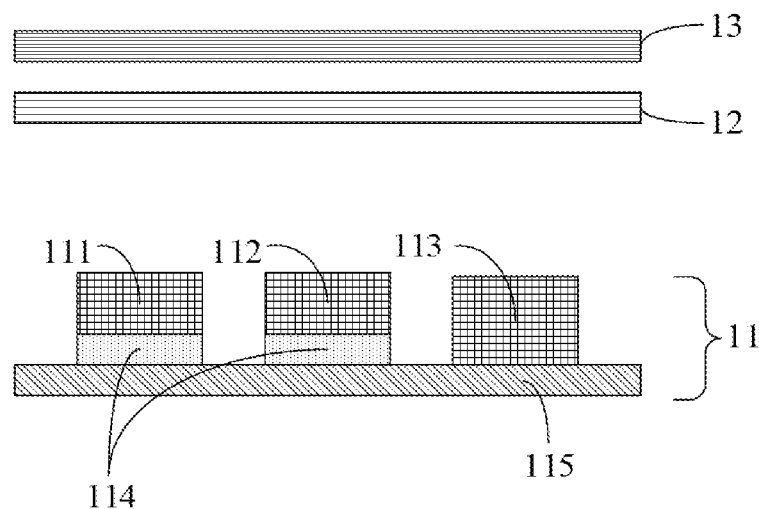
FIG. 1 is a schematic structural view of an embodiment of a liquid crystal display panel provided by the present disclosure.

Please refer to FIG. 1. FIG. 1 is a schematic structural diagram of an embodiment of a liquid crystal display panel provided by the present disclosure. As shown in FIG. 1, the liquid crystal display panel may include an array substrate 12, a color film substrate 11 and a blue backlight 13. The array substrate 12 may be disposed to face the color film substrate 11. In this embodiment, the array substrate 12 may be a TFT substrate. The blue backlight 13 may be disposed on a side of the array substrate 12 away from the color film substrate 11. The color film substrate 11 may include a base substrate 115, red quantum dot blocks 111, green quantum dot blocks 112 and blue light blocks 113. The blue light blocks 113 may be excited by blue light generated by the blue backlight 13 so as to generate respectively blue light. The red quantum dot blocks 111, green quantum dot blocks 112 and blue light blocks 113 may be spaced apart from each other and disposed on the base substrate 115. The color film substrate 11 may further include a yellow light layer 114. The yellow light layer 114 may be disposed between the red quantum dot blocks 111 and the base substrate 115 and also between the green quantum dot blocks 112 and the base substrate 115. The red quantum dot blocks 111 and the green quantum dot blocks 112 may be excited by blue light generated by the blue backlight 13 so as to generate respectively red light and green light while the blue light blocks 113 may either be excited to generate blue light or let the blue light generated by the blue backlight 13 to pass. In an embodiment, the blue light blocks 113 may be blue quantum dot blocks. The yellow light layer 114 may block the blue light penetrating through the red quantum dot blocks 111 and the green quantum dot blocks 112 such that the color gamut value of the liquid crystal display panel may be enhanced.

In the present disclosure, the yellow light layer 114 may let red light and green light pass but absorb blue light, and it is not excited to display color, that is, it does not affect the light emitted by the red quantum dot blocks 111 and the green quantum dot blocks 112. Thus the color gamut value of the liquid crystal display panel may be enhanced.

It can be seen from the above that the liquid crystal display panel of the present disclosure may be provided with the red quantum dot blocks 111, the green quantum dot blocks 112 and the blue light blocks 113 on the base substrate 115. And the yellow light layer 114 may be disposed between the red quantum dot blocks 111 and the base substrate 115 and also between the green quantum dot blocks 112 and the base substrate 115. The yellow light layer 114 may block the blue light penetrating though the red quantum dot blocks 111 and the green quantum dot blocks 112, thereby improving the color gamut value of the liquid crystal display panel.

Figure 2:
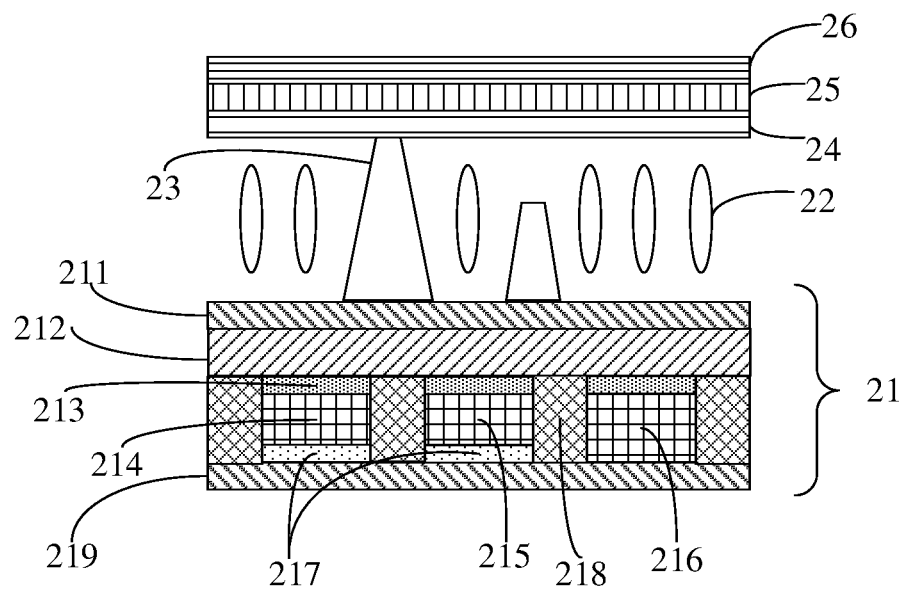
FIG. 2 is a schematic structural view of another embodiment of a liquid crystal display panel provided by the present disclosure.

Please refer to FIG. 2. FIG. 2 is a schematic structural diagram of another embodiment of a liquid crystal display panel provided by the present disclosure. As shown in FIG. 2, the liquid crystal display panel may include a color film substrate 21, an array substrate 24 disposed to face the color film substrate 21, a blue backlight 26 located on one side of the array substrate 24 away from the color film substrate 21, a second polarizer 25 disposed between the array substrate 24 and the blue backlight 26, liquid crystal 22 and support columns 23. The liquid crystal 22 and the support columns 23 may be disposed between the array substrate 24 and the color film substrate 21. The support columns 23 may keep the array substrate 24 spaced apart from the color film substrate 21, such that the liquid crystal 22 may be filled in the space between the array substrate 24 and the color film substrate 21. The color film substrate 21 may include a base substrate 219, red quantum dot blocks 214, green quantum dot blocks 215, blue light blocks 216 and a yellow light layer 217. The red quantum dot blocks 214, the green quantum dot blocks 215 and the blue light blocks 216 may be spaced apart from each other and distributed on the base substrate 219. In this embodiment, the blue light blocks 216 may be blue quantum dot blocks. The yellow light layer 217 may be disposed between the red quantum dot blocks 214 and the base substrate 219 and also between the green quantum dot blocks 215 and the base substrate 219. The yellow light layer 217 may block the blue light emitted by the blue backlight 26 and penetrating through the red quantum dot blocks 214 and the green quantum dot blocks 215, so as to prevent the red light and green light generated by the red quantum dot blocks 214 and the green quantum dot blocks 215 from the influence of the blue light. Thus the implementation of the present disclosure may enhance the color gamut value of the liquid crystal display panel.

Further, a water-oxygen barrier layer 213 made of light transmissive material may be provided on a side of each of the red quantum dot blocks 214, the green quantum dot blocks 215, and the blue light blocks 216 away from the base substrate 219 in some embodiments. Since the red quantum dot blocks 214, the green quantum dot blocks 215 and the blue light blocks 216 are sensitive to water, oxygen and heat, the water-oxygen barrier layer 213 may prevent water, oxygen and heat from affecting the red quantum dot blocks 214, the green quantum dot blocks 215 and the blue light blocks 216, thereby extending the service life of the liquid crystal display panel. Furthermore, the water-oxygen barrier layer 213 is made of light transmissive material that does not affect the blue light incident to the red quantum dot blocks 214, the green quantum dot blocks 215, and the blue light blocks 216.

In other embodiments, a water-oxygen barrier layer may also be disposed between the yellow light layer 217 and the base substrate 219, or between the blue light blocks 216 and the base substrate 219, which can improve the service life of the liquid crystal display panel to a greater extent.

In this embodiment, a first polarizer 211 may be disposed on a side of the water-oxygen barrier layer 213 away from the substrate 219, and the second polarizer 25 may be disposed between the blue backlight 26 and the array substrate 24. The first polarizer 211 and the second polarizer 25 may be specifically metal wire grid polarizers prepared by using nanoimprint technology.

In this embodiment, a planarization layer 212 may be disposed between the water-oxygen barrier layer 213 and the first polarizer 211. The planarization layer 212 may be made of silicon nitride or silicon oxide. As we know, it is difficult to form a polarizer having excellent performance on an uneven film layer. In this embodiment, planarization may be realized by providing the planarization layer 212 on the water-oxygen barrier layer 213, thereby facilitating preparation of the first polarizer 211 having excellent performance. Moreover, the planarization layer 212 can further reduce the influence of water, oxygen, and heat on the red quantum dot blocks 214, the green quantum dot blocks 215, and the blue light blocks 216.

In this embodiment, the blue light layers 216 may be blue quantum dot blocks.

Further, in the embodiment, a black light-masking layer 218 may be disposed on the base substrate 219, and in the space among the red quantum dot blocks 214, the green quantum dot blocks 215, and the blue light blocks 216. Specifically, the black light-masking layer 218 may be disposed in the space among the red quantum dot blocks 214 and the green quantum dot blocks 215 to avoid optical crosstalk between the red quantum dot block 214 and the green quantum dot block 215. The black light-masking layer 218 may be disposed in the space among the green quantum dot blocks 215 and the blue light blocks 216 to avoid optical crosstalk between the green quantum dot block 215 and the blue light block 216. And the black light-masking layer 218 may be disposed in the space among the red quantum dot blocks 214 and the blue light blocks 216 to avoid optical crosstalk between the red quantum dot block 214 and the blue light block 216.

In some embodiments, the thickness of the black light-masking layer 218 may be no less than the sum of the thicknesses of the yellow light layer 217 and anyone of the red quantum dot blocks 214, or the thicknesses of the yellow light layer 217 and anyone of the green quantum dot blocks 215, such that the optical crosstalk can be reduced to a greater extent. In other embodiments, the thickness of the black light-masking layer 218 may be less than the sum of the thicknesses of the yellow light layer 217 and one of the red quantum dot blocks 214, or the thickness of the yellow light layer 217 and one of the green quantum dot blocks 215, which is not specifically limited herein.

Further, in this embodiment, a thickness ratio of the yellow light layer 217 to one of the red quantum dot blocks 214 or one of the green quantum dot blocks 215 may be in the range of 1:1 to 1:6. In this circumstance, the yellow light layer 217 may allow red light and green light to pass while effectively absorbing blue light, and thereby enhancing the color gamut value of the liquid crystal display panel.

Figure 3:
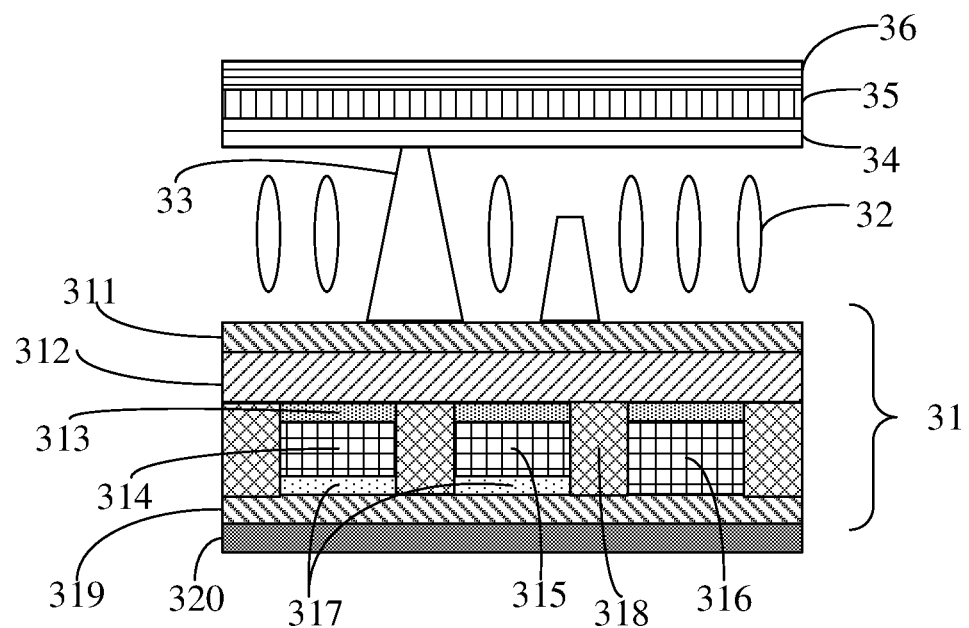
FIG. 3 is a schematic structural view of another embodiment of a liquid crystal display panel provided by the present disclosure.

Please refer to FIG. 3. FIG. 3 is a schematic structural diagram of another embodiment of a liquid crystal display panel provided by the present disclosure. As shown in FIG. 3, the liquid crystal display panel may include an array substrate 34, a blue backlight 36, a second polarizer 35 disposed between the blue backlight 36 and the array substrate 34, a color film substrate 31 disposed on a side of the array substrate 34 away from the blue backlight 36, support columns 33 disposed between the array substrate 34 and the film substrates 31, and liquid crystal 32 filled in the space among the support columns 33.

The color film substrate 31 may include a base substrate 319, red quantum dot blocks 314, green quantum dot blocks 315 and blue light blocks 316. The red quantum dot blocks 314, the green quantum dot blocks 315 and the blue quantum dot blocks 316 may be disposed on the base substrate 319 and spaced apart from each other. In this embodiment, the blue light blocks 316 are blue quantum dot blocks. A yellow light layer 317 is disposed between the red quantum dot blocks 314 and the base substrate 319 and also between the green quantum dot blocks 315 and the base substrate 319.

In this embodiment, a water-oxygen barrier layer 313 may be disposed on a side of the red quantum dot blocks 314, the green quantum dot blocks 315, and the blue light blocks 316 away from the base substrate 319. The function of the water-oxygen barrier layer 313 in the present embodiment may be the same as that in the above-described embodiment.

The color film substrate 31 may further include a planarization layer 312 disposed on a side of the water-oxygen barrier layer 313 away from the base substrate 319, and a first polarizer 311 disposed on the planarization layer 312.

Furthermore, a black light-masking layer 318 may be disposed in space among the red quantum dot blocks 314, the green quantum dot blocks 315, and the blue light blocks 316. The function of the black light-masking layer 318 in the present embodiment may be the same as the previous embodiment.

In this embodiment, an anti-reflection layer 320 with moth-eye structure may be further disposed on a side of the base substrate 319 away from the blue backlight 36, and the material of the anti-reflection layer 320 may be aluminum. The anti-reflection layer 320 may be prepared by using nanoimprint technology. It may be utilized to reduce reflection of external light, thereby improving display contrast of the liquid crystal display panel.

Figure 4:
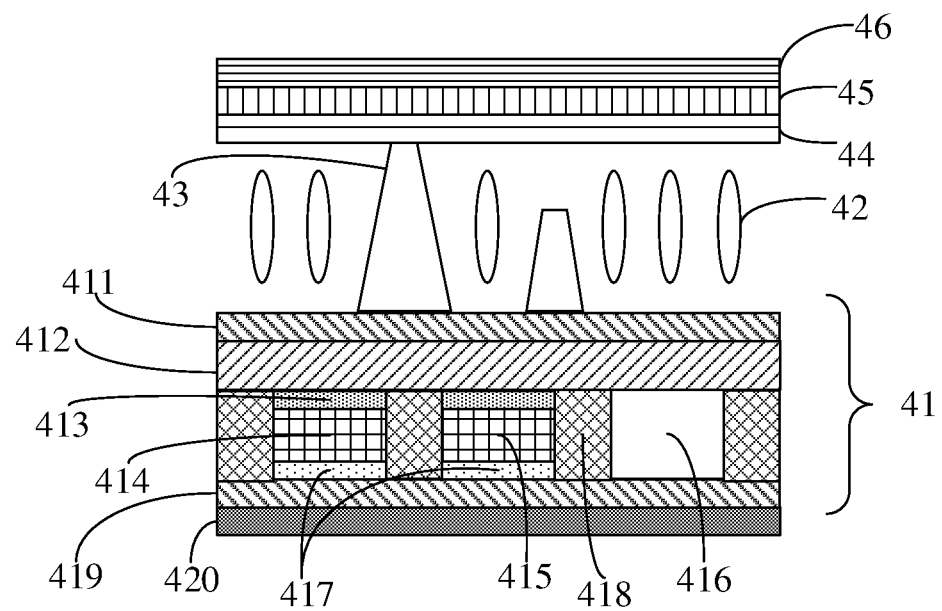
FIG. 4 is a schematic structural view of another embodiment of a liquid crystal display panel provided by the present disclosure.

Please refer to FIG. 4. FIG. 4 is a schematic structural diagram of another embodiment of a liquid crystal display panel provided by the present disclosure. As shown in FIG. 4, the liquid crystal display panel may include a blue backlight 46, an array substrate 44, a second polarizer 45 disposed between the array substrate 44 and the blue backlight 46, a color film substrate 41 disposed on a side of the array substrate 44 away from the blue backlight 46. The liquid crystal display panel may also include liquid crystal 42 and support columns 43 disposed between the array substrates 44 and the color film substrate 41. The color film substrate 41 may include a base substrate 419, red quantum dot blocks 414, green quantum dot blocks 415 and blue light blocks 416. The red quantum dot blocks 414, the green quantum dot blocks 415, and the blue light blocks 416 may be spaced apart from each other on the base substrate 419. A yellow light layer 417 may be disposed between the red quantum dot blocks 414 and the base substrate 419, and also between the green quantum dot blocks 415 and the base substrate 419. In this embodiment, the blue light blocks 416 may be transparent color blocks, and the blue light emitted by the blue backlight 46 may penetrate the transparent color blocks to display blue. The transparent color blocks may be insensitive to water, oxygen, and heat, so that no water-oxide barrier layer is disposed on the side of the transparent color blocks away from the substrate 419 in the present embodiment. Instead, a water-oxygen barrier layer 413 may be disposed on a side of the red quantum dot blocks 414 away from the base substrate 419, and also disposed on a side of the green quantum dot blocks 415 away from the base substrate 419.

In other embodiments, the water-oxygen barrier layer may be disposed on a side of the blue light blocks 416 away from the base substrate 419, which is not specifically limited herein.

Further, a planarization layer 412 may be disposed on a side of the water-oxide barrier layer 413 and the blue light blocks 416 away from the base substrate 419. And a first polarizer 411 may be disposed on a side of the planarization layer 412 away from the base substrate 419. The planarization achieved by providing the planarization layer 412 can facilitate the preparation of the first polarizer 411. The material of the planarization layer 412 in this embodiment may be silicon nitride or silicon oxide. The planarization layer 412 may further protect the red quantum dot color block 414, the green quantum dot block 415, and the blue light blocks 416 from the influence of water, oxygen, and heat.

Further, in the present embodiment, a black light-masking layer 418 is disposed in space among the red quantum dot blocks 414, the green quantum dot blocks 415, and the blue light blocks 416. In addition, an anti-reflection layer 420 may be further disposed on a side of the base substrate 419 away from the blue backlight 46. The functions of the black light-masking layer 418 and the anti-reflection layer 420 in the present embodiment may be the same as those in the above-described embodiment.

Figure 5:
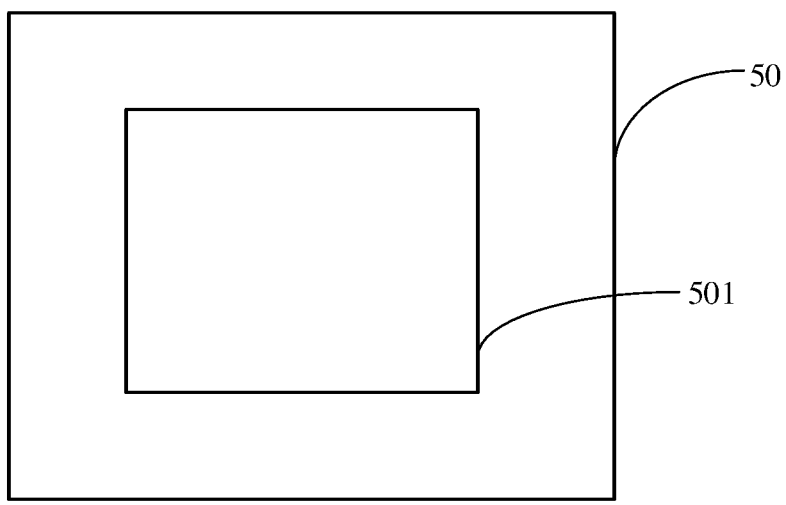
FIG. 5 is a schematic structural view of an embodiment of a liquid crystal display device provided by the present disclosure.

Please refer to FIG. 5. FIG. 5 is a schematic structural diagram of an embodiment of a liquid crystal display device provided by the present disclosure. As shown in FIG. 5, the liquid crystal display device 50 may include the liquid crystal display panel 501 of any of the above embodiments.

The beneficial effect of the above embodiments lies in that: the color film substrate in the liquid crystal display panel of the present disclosure may include a base substrate and red quantum dot blocks, green quantum dot blocks and blue light blocks disposed on the base substrate. The red quantum dot blocks, the green quantum dot blocks and the blue light blocks may be distributed on the base substrate. And a yellow light layer may be disposed between the red quantum dot blocks and the base substrate, and also between the green quantum dot blocks and the base substrate, which can block the blue light penetrating through the red quantum dot blocks and the green quantum dot blocks, and avoid the influence of the blue light on the red light produced by the red quantum dot blocks and on the green light produced by the green quantum dot blocks. Thus the color gamut value of the liquid crystal display panel may be enhanced and the display effect may be improved.

The above description depicts merely some exemplary embodiments of the disclosure, but is not meant to limit the scope of the disclosure. Any equivalent structure or flow transformations made to the disclosure, or any direct or indirect applications of the disclosure on other related fields, shall all be covered within the protection of the disclosure.

What is claimed is:

1. A liquid crystal display panel, comprising:
    a color film substrate comprising
        a base substrate,
        red quantum dot blocks, green quantum dot blocks and blue light blocks disposed on the base substrate,
        a yellow light layer disposed between the red quantum dot blocks and the base substrate, and also between the green quantum dot blocks and the base substrate;
        a water-oxygen barrier layer made of light transmissive material disposed on sides of the red quantum dot blocks, the green quantum dot blocks, and the blue light blocks far away from the base substrate, wherein the water-oxygen barrier layer is consisted of a plurality of water-oxygen barrier patterns corresponding to the red quantum dot blocks, the green quantum dot blocks, and the blue light blocks, each water-oxygen barrier pattern is disposed on a corresponding one of the red quantum dot blocks, the green quantum dot blocks, and the blue light blocks;
        a black light-masking layer disposed on the base substrate, and is consisted of a plurality of black light-masking pattern, wherein each black light-masking pattern is between every two adjacent of the red quantum dot blocks, the green quantum dot blocks, and the blue light blocks, a thickness of each black light-masking pattern is no less than a sum of a thickness of the yellow light layer, a thickness of a corresponding one of the red quantum dot blocks and a thickness of a corresponding one of the water-oxygen barrier patterns, or a sum of a thickness of the yellow light layer, a thickness of a corresponding one of the green quantum dot blocks and a thickness of a corresponding one of the water-oxygen barrier patterns;
    an array substrate disposed to face the color film substrate; and
    a blue backlight disposed on a side of the array substrate away from the color film substrate.

2. The liquid crystal display panel according to claim 1, further comprising an anti-reflection layer disposed on a side of the base substrate away from the blue backlight.

3. The liquid crystal display panel according to claim 1, wherein a thickness ratio of the yellow light layer to anyone of the red quantum dot blocks or the green quantum dot blocks is in the range of 1:1~1:6.

4. The liquid crystal display panel according to claim 1, further comprising a first polarizer and a second polarizer, wherein the first polarizer is disposed on a side of the water-oxygen barrier layer away from the base substrate, and the second polarizer is disposed between the blue backlight and the array substrate.

5. The liquid crystal display panel according to claim 4, wherein the first polarizer and the second polarizer are metal wire grid polarizers.

6. The liquid crystal display panel according to claim 4, further comprising a planarization layer, wherein the planarization layer is disposed between the water-oxygen barrier layer and the first polarizer.

7. The liquid crystal display panel according to claim 1, wherein the blue light blocks are blue quantum dot blocks or transparent color blocks.

8. The liquid crystal display panel according to claim 1, further comprising liquid crystal and support columns disposed between the array substrate and the color film substrate, wherein the support columns are disposed between the array substrate and the color film substrate, the liquid crystal is filled in space among the support columns.

9. A liquid crystal display device with a liquid crystal display panel, wherein the liquid crystal display panel comprises:
    a color film substrate comprising
        a base substrate,
        red quantum dot blocks, green quantum dot blocks and blue light blocks disposed on the base substrate,
        a yellow light layer disposed between the red quantum dot blocks and the base substrate, and also between the green quantum dot blocks and the array substrate;
        a water-oxygen barrier layer made of light transmissive material disposed on sides of the red quantum dot blocks, the green quantum dot blocks, and the blue light blocks away from the base substrate, wherein the water-oxygen barrier layer is consisted of a plurality of water-oxygen barrier patterns corresponding to the red quantum dot blocks, the green quantum dot blocks, and the blue light blocks, each water-oxygen barrier pattern is disposed on a corresponding one of the red quantum dot blocks, the green quantum dot blocks, and the blue light blocks;
        a black light-masking layer disposed on the base substrate, and is consisted of a plurality of black light-masking pattern, wherein each black light-masking pattern is between every two adjacent of the red quantum dot blocks, the green quantum dot blocks, and the blue light blocks, a thickness of each black light-masking pattern is no less than a sum of a thickness of the yellow light layer, a thickness of a corresponding one of the red quantum dot blocks and a thickness of a corresponding one of the water-oxygen barrier patterns, or a sum of a thickness of the yellow light layer, a thickness of a corresponding one of the green quantum dot blocks and a thickness of a corresponding one of the water-oxygen barrier patterns;
    an array substrate disposed to face the color film substrate; and a blue backlight disposed on a side of the array substrate away from the color film substrate.

10. The liquid crystal display device according to claim 9, further comprising an anti-reflection layer disposed on a side of the base substrate away from the blue backlight.

11. The liquid crystal display device according to claim 9, wherein a thickness ratio of the yellow light layer to any one of the red quantum dot blocks or the green quantum dot blocks is in the range of 1:1~1:6.

12. The liquid crystal display device according to claim 9, further comprising a first polarizer and a second polarizer, wherein the first polarizer is disposed on a side of the water-oxygen barrier layer away from the base substrate, and the second polarizer is disposed between the blue backlight and the array substrate.

13. The liquid crystal display device according to claim 12, wherein the first polarizer and the second polarizer are metal wire grid polarizers.

14. The liquid crystal display device according to claim 12, further comprising a planarization layer, wherein the planarization layer is disposed between the water-oxygen barrier layer and the first polarizer.

15. The liquid crystal display device according to claim 9, wherein the blue light blocks are blue quantum dot blocks or transparent color blocks.

16. The liquid crystal display device according to claim 9, further comprising liquid crystal and support columns disposed between the array substrate and the color film substrate, wherein the support columns are disposed between the array substrate and the color film substrate, the liquid crystal is filled in space among the support columns.

* * * * *